US012801094B2

(12) United States Patent
Akahori

(10) Patent No.: US 12,801,094 B2
(45) Date of Patent: Nov. 17, 2026

(54) ELECTRONIC CONTROL APPARATUS

(71) Applicant: LAPIS Technology Co., Ltd., Yokohama (JP)

(72) Inventor: Hiroji Akahori, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 956 days.

(21) Appl. No.: 17/987,868

(22) Filed: Nov. 16, 2022

(65) Prior Publication Data

US 2023/0168637 A1 Jun. 1, 2023

(30) Foreign Application Priority Data

Nov. 30, 2021 (JP) ................................. 2021-194911

(51) Int. Cl.
*G05B 13/02* (2006.01)
*G06F 13/10* (2006.01)

(52) U.S. Cl.
CPC ........... *G05B 13/02* (2013.01); *G06F 13/102* (2013.01)

(58) Field of Classification Search
CPC .. G05B 13/02; G05B 19/0425; G05B 23/024; G05B 2219/2614; G05B 19/0423; G05B 2219/24215; G06F 13/102; B60R 16/0232
See application file for complete search history.

(56) References Cited

U.S. PATENT DOCUMENTS

2016/0098071 A1* 4/2016 Itou ........................ G06F 1/3209 713/323
2019/0141074 A1* 5/2019 Oka ........................ H04L 43/50
2019/0342115 A1* 11/2019 Lieder ..................... H04L 12/40
2021/0294877 A1* 9/2021 Konrardy ........... G01C 21/3415

FOREIGN PATENT DOCUMENTS

JP 2016038620 3/2016

OTHER PUBLICATIONS

Nao Terae, Programmable logic controller and failure diagnosis method in the same (ip.com machine translation of JP 2011-69694 A), Apr. 7, 2011, ip.com machine translations (Year: 2011).*

* cited by examiner

*Primary Examiner* — Christopher W Carter
(74) *Attorney, Agent, or Firm* — JCIPRNET

(57) ABSTRACT

An electronic control apparatus according to the disclosure includes: a controller, controlling the peripheral machines at a time of a normal operation mode, and performing diagnosis on whether a failure occurs with respect to at least one of the peripheral machines at a time of a monitoring mode.

16 Claims, 10 Drawing Sheets

ELECTRONIC CONTROL APPARATUS

CROSS-REFERENCE TO RELATED APPLICATION

This application claims priority under 35 USC 119 from Japanese Patent application No. 2021-194911 filed on Nov. 30, 2021, the disclosure of which is incorporated by reference herein.

BACKGROUND

Technical Field

The disclosure relates to an electronic control apparatus, and particularly relates to an electronic control apparatus including a controller, such as a microcomputer, and a peripheral machine thereof.

Description of Related Art

In recent years, for vehicle traveling safety, comfort of indoor space, and traveling support, attempts have been made in electronic control of electrical components of vehicles. At this time, electronic control units (ECUs) as microcomputers dedicated for controlling devices such as the air conditioner, engine, transmission, brake, traveling support device of a vehicle are provided in the respective devices.

Meanwhile, alongside the electrical control of vehicles as described above, an electronic control apparatus provided with a monitoring device monitoring whether an abnormality (failure) occurs in the operation of the ECU or the peripheral machine thereof has been proposed (see, for example, Japanese Patent Application Laid-open (JP-A) No. 2016-38620). The electronic control apparatus is provided with a monitor monitoring the operational abnormality of the microcomputer as well as the peripheral machine outside the microcomputer controlling the peripheral machine. The monitor monitors a signal for watchdog timer clearing (a WDC signal) output from the microcomputer, and, in the case where the cycle of the WDC signal changes, the monitor determines that an abnormality occurs in the microcomputer and the peripheral machine.

Meanwhile, in a vehicle subject to electronic control, as described above, a dedicated ECU is provided for each device that serves as the control target (e.g., engine, brake, air conditioner). In addition, when controlling each device, the ECU actually controls the peripheral machines such as drivers that drive a motor and a display, various sensors, and power circuits.

Therefore, when the monitor recited in JP-A No. 2016-38620 is provided for each of the multiple ECUs mounted in a vehicle to individually monitor the operational abnormality (failure) of each of the peripheral machines, the scale of the entire system is increased, and the cost is also increased.

SUMMARY

An electronic control apparatus according to the disclosure includes: multiple peripheral machines, each performing outputting in response to a signal that is input; and a controller, set to a normal operation mode or a monitoring mode, controlling the peripheral machines at a time of the normal operation mode, and performing diagnosis on whether a failure occurs with respect to at least one of the peripheral machines at a time of the monitoring mode.

In addition, an electronic control apparatus according to the disclosure includes: multiple peripheral functions, each performing outputting in response to a signal that is input; and a control function, set to a normal operation mode or a monitoring mode, controlling the peripheral machines at a time of the normal operation mode, and performing diagnosis on whether a failure occurs with respect to at least one of the peripheral machines at a time of the monitoring mode, wherein in the control function, a control signal for normal operation is output and the control signal is input to the peripheral machines at the time of the normal operation mode, and, at the time of the monitoring mode, a pseudo signal for failure checking is output, the pseudo signal is input to the at least one peripheral machine, and an output signal output by the at least one peripheral machine in response to the pseudo signal is captured, and a failure diagnosis result is obtained according to whether the output signal that is captured is consistent with a predetermined expected value.

An electronic control apparatus of the disclosure is a control apparatus that controls multiple peripheral machines. The control apparatus performs: a first control, respectively supplying multiple control signals controlling the peripheral machines to the peripheral machines; and a second control, supplying a pseudo signal for failure checking to at least one of the peripheral machines, capturing an output signal output by the at least one peripheral machine in accordance with the pseudo signal, and obtaining a failure diagnosis result according to whether the output signal that is captured is consistent with a predetermined expected value.

DESCRIPTION OF THE EMBODIMENTS

The disclosure provides an electronic control apparatus capable of monitoring whether each of the peripheral machines connected to a controller such as a microcomputer fails without increasing the cost.

With the electronic control apparatus according to the disclosure, the diagnosis on whether each of the multiple peripheral machines connected to the controller fails can be determined inside the controller. Accordingly, compared with the conventional configuration in which the monitor for failure monitoring is provided outside the controller for each peripheral machine, the scale can be reduced. In addition, with the MCU collectively monitoring whether multiple peripheral machines fail, the scale can be reduced.

Therefore, according to the disclosure, it is possible to monitor whether each of the peripheral machines connected to the controller fails without increasing the cost.

In addition, according to the electronic control apparatus of the disclosure, since the monitor for failure monitoring is not provided for each peripheral machine, the configuration of the peripheral device 120 is simplified.

Therefore, according to the disclosure, it is possible to easily assemble the peripheral device 120.

In the following, the embodiments of the disclosure are described in detail with reference to the drawings.

Embodiment 1

Figure 1:
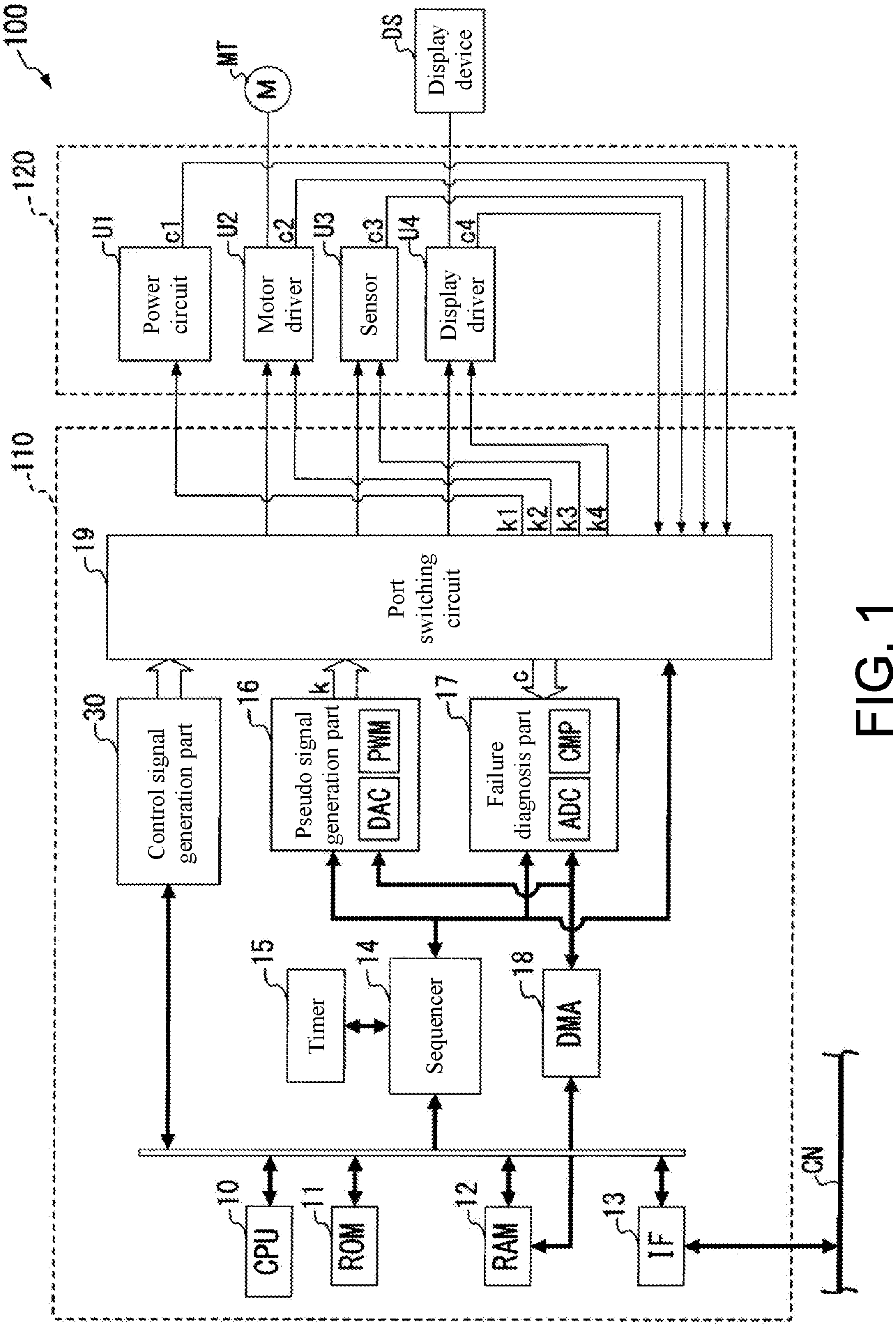
FIG. 1 is a block diagram illustrating a configuration of an electronic control apparatus 100 according to a first embodiment of the disclosure.

FIG. 1 is a block diagram illustrating a configuration of an electronic control apparatus 100 according to a first embodiment of the disclosure.

The electronic control apparatus 100 is, for example, provided for controlling the electrical component for each electrical component of a vehicle, and is connected to an in-vehicle network CN, such as a controller area network (CAN), a local interconnect network (LIN), etc.

In FIG. 1, as the electronic control apparatus 100, for example, a portion for controlling a motor MT and a display device DS included in one electrical component among multiple electrical components mounted in the vehicle is extracted and a configuration thereof is shown.

The electronic control apparatus 100 includes a microcomputer 110 (referred to as MCU 110 in the following) as a controller and a peripheral device 120 connected to the MCU 110.

The MCU 110 includes a central processing unit (CPU) 10 connected to a CPU bus, a read only memory (ROM) 11, a random access memory (RAM) 12, an interface (IF) part 13, a sequencer 14, a port switching circuit 19, and a control signal generation part 30. In addition, the MCU 110 includes a timer 15, a pseudo signal generation part 16, a failure diagnosis part 17, and a direct memory access (DMA) circuit 18.

The periphery device 120 includes a power circuit U1, a motor driver U2, a sensor U3, and a display driver U4 respectively as peripheral machines. Through the peripheral machine, a peripheral function of performing outputting in response to an input signal is executed.

In the ROM 11 of the MCU 110, a program controlling the operation of the electronic control apparatus 100 as well as pseudo input data and expected value data for failure checking, etc., are stored in advance. It is noted that the program, the pseudo input data, and the expected value data stored in the ROM 11 are read out to the CPU bus and respectively stored in the RAM 12 when power is turned on.

By executing the program stored in the RAM 12, the CPU 10 controls the interface part 13, the sequencer 14, the port switching circuit 19, and the control signal generation part 30.

In response to an instruction from the CPU 10, the interface part 13 captures data on the in-vehicle network CN and sends out the data to the CPU bus, or sends out the data on the CPU bus to the in-vehicle network CN.

In response to an execution command from the CPU 10, the sequencer 14 sets the pseudo signal generation part 16, the failure diagnosis part 17, and the port switching circuit 19 to one of a normal operation mode and a monitoring mode. It is noted that the sequencer 14 periodically switches from the normal operation mode to the monitoring mode, and switches from the monitoring mode to the normal operation mode.

In addition, in a predetermined processing order that is in accordance with multiple timing signals supplied from the timer 15 and respectively corresponds to the normal operation mode and the monitoring mode, the sequencer 14 exerts a sequence control for executing respective internal processes on the pseudo signal generation part 16, the failure diagnosis part 17, and the port switching part 19. Through the sequencer 14, control functions respectively corresponding to the normal operation mode and the monitoring mode are executed.

The DMA circuit 18 reads out the pseudo input data from the RAM 12 without going through the CPU 10 and the CPU bus, and supplies the pseudo input data to the pseudo signal generation part 16 and the failure diagnosis part 17.

Through the control of the CPU 10, the control signal generation part 30 generates a control signal group for respectively and individually operating the motor driver U2, the sensor U3, and the display driver U4 normally, and supplies the control signal group to the port switching circuit 19.

The pseudo signal generation part 16 includes a DA converter (referred to as a DAC in the following) and a pulse width modulation circuit (referred to as a PWM circuit in the following).

In the case of being set to the monitoring mode, the pseudo signal generation part 16 performs operations as follows. That is, firstly, the pseudo signal generation part 16 captures the pseudo input data via the DMA circuit 18. Then, by using the DAC or the PWM circuit, the pseudo signal generation part 16 generates, based on the pseudo input data, pseudo signals k1 to k4 for monitoring the respective operations of the power circuit U1, the motor driver U2, the sensor U3, and the display driver U4. For example, the pseudo signal is an analog signal output via the DAC. In addition, although the pseudo signal generation part 16 captures the pseudo input data via the DMA circuit 18 and generates the pseudo signals k1 to k4, a storage part storing the data for generating pseudo signals may also be internally provided in the pseudo signal generation part 16.

It is noted that the pseudo signal generation part 16 generates, one after another in order, the pseudo signals k1 to k4 in accordance with the sequence control corresponding to the monitoring mode conducted by the sequencer 14. The pseudo signal generation part 16 supplies the pseudo signals k1 to k4 to the port switching circuit 19 in an order in which the pseudo signals k1 to k4 are generated.

The failure diagnosis part 17 includes an AD converter (referred to as "ADC" in the following) and a comparator (referred to as "CMP" in the following).

In the case of being set to the monitoring mode, the failure diagnosis part 17 performs operations as follows. That is, firstly, the failure diagnosis part 17 captures the expected value data via the DMA circuit 18. Then, the failure diagnosis part 17 captures analog output signals c1 to c4 output from the power circuit U1, the motor driver U2, the sensor U3, and the display driver U4 via the port switching circuit 19. The failure diagnosis part 17 uses ADC and converts the respective output signals c1 to c4 into first to fourth output digital signals represented in digital values. Then, the failure diagnosis part 17 uses CMP and determines whether the expected value corresponding to each of the first to fourth output digital signals shown in the expected value data is consistent with the output digital signal. Here, the failure diagnosis part 17 stores failure diagnosis result data in the RAM 12 via the DMA 18. The failure diagnosis result data indicates, for each of the power circuit U1, the motor driver U2, the sensor U3, and the display driver U4, a failure diagnosis result indicating that there is no failure in the case where the expected value is consistent with the output digital value and that there is a failure in the case where the expected value is not consistent with the output digital value. At this time, the CPU 10 reads out the failure diagnosis result data stored in the RAM 12, and sends the failure diagnosis result data to the in-vehicle network CN via the CPU bus and the interface part 13.

During the time of being set to the normal operation mode, the port switching circuit 19 captures the control signal group supplied from the control signal generation part 30. At this time, the port switching circuit 19 supplies a motor control signal included in the control signal group to the motor driver U2, supplies a sensor control signal included in the control signal group to the sensor U3, and supplies a display control signal included in the control signal group to the display driver U4.

Meanwhile, during the time of being set to the monitoring mode, the port switching circuit 19 captures the pseudo signals k1 to k4 that are supplied from the pseudo signal generation part 16. At this time, the port switching circuit 19 supplies the pseudo signal k1 for monitoring the operation of the power circuit U1 to the power circuit U1, and supplies the pseudo signal k2 for monitoring the operation of the motor driver U2 to the motor driver U2. In addition, the port switching circuit 19 supplies the pseudo signal k3 for monitoring the operation of the sensor U3 to the sensor U3, and supplies the pseudo signal k4 for monitoring the operation of the display driver U4 to the display driver U4.

In addition, during the time of being set to the monitoring mode, the port switching circuit 19 captures the output signal c1 output from the power circuit U1 in response to the pseudo signal k1 and the output signal c2 output from the motor driver U2 in response to the pseudo signal k2. Moreover, during this time, the port switching circuit 19 captures the output signal c3 output from the sensor U3 in response to the pseudo signal k3, and the output signal c4 output from the display driver U4 in response to the pseudo signal k4. The port switching circuit 19 supplies the output signals c1 to c4 so captured to the failure diagnosis part 17.

The power circuit U1 generates various power voltages for operating the respective functional modules (10 to 19, 30, U1 to U4) included in the electronic control apparatus 100 as described above, and respectively supplies corresponding power voltages to the respective functional modules. It is noted that, at the time of the monitoring mode, the power circuit U1 receives the pseudo signal k1, generates the output signal c1 having a voltage value responsive to the pseudo signal k1, and supplies the output signal c1 to the port switching circuit 19.

At the time of a normal mode, the motor driver U2 receives the motor control signal included in the control signal group output from the control signal generation part 30 via the port switching circuit 19, and supplies a motor driving voltage responsive to the motor control signal to the motor MT as a load. The motor MT rotates its own rotor in response to the motor driving voltage.

Meanwhile, at the time of the monitoring mode, the motor driver U2 receives the pseudo signal k2 and generates a motor driving voltage having a voltage value responsive to the pseudo signal k2. Then, the motor driver U2 generates the output signal c2 indicating the voltage value of the generated motor driving voltage, and supplies the output signal c2 to the port switching circuit 19.

At the time of the normal mode, the sensor U3 receives the sensor control signal included in the control signal group output from the control signal generation part 30 via the port switching circuit 19. Then, in response to the sensor control signal, the sensor U3 detects a physical or chemical phenomenon, such as temperature, acceleration, pressure, and outputs a detection signal converting a detected amount into an electrical signal.

Meanwhile, at the time of the monitoring mode, the sensor U3 receives the pseudo signal k3, and, in response to the pseudo signal k3, supplies the output signal c3 indicating the level of the detection signal obtained by detecting the physical or chemical phenomenon as described above to the port switching circuit 19.

At the time of the normal mode, the display driver U4 receives the display control signal included in the control signal group output from the control signal generation part 30 via the port switching circuit 19, and supplies a display driving voltage responsive to the display control signal to the display device DS as a load. The display device DS displays an image or emits light (including blinking) based on the display driving voltage.

Meanwhile, at the time of the monitoring mode, the display driver U4 receives the pseudo signal k4 and generates a display driving voltage having a voltage value responsive to the pseudo signal k4. Then, the display driver U4 generates the output signal c4 indicating the voltage value of the generated display driving voltage, and supplies the output signal c4 to the port switching circuit 19.

Figure 2:
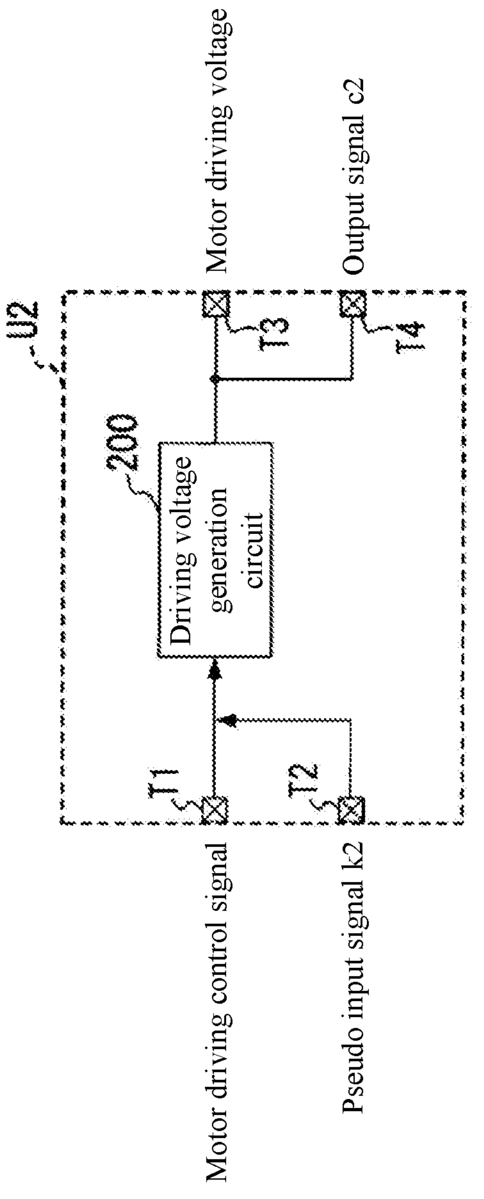
FIG. 2 is a block diagram illustrating an input/output configuration of a motor driver U2.

FIG. 2 is a block diagram extracting the motor driver U2 from the power circuit U1, the motor driver U2, the sensor U3, and the display driver U4 respectively as the peripheral machines included in the peripheral derive 120, and illustrating an example of an input/output configuration of each peripheral machine.

As shown in FIG. 2, the motor driver U2 is formed by input terminals T1 and T2, output terminals T3 and T4, and a main function part 200 responsible for a main function of the motor driver U2.

The motor driver U2 receives the motor control signal for normal operation by using the input terminal T1, and receives the pseudo signal k2 used in the monitoring mode by using the input terminal T2.

The main function part 200 receives the motor control signal received by using the input terminal T1 by using its own input end, generates the motor driving voltage based on the motor control signal and outputs the motor driving voltage. At this time, the motor driver U2 supplies the motor driving voltage output from the output end of the main function part 200 to the motor MT via the output terminal T3.

In addition, the main functional part 200 receives, by using the input end, the pseudo signal k2 received by using the input terminal T2 or a level-adjusted pseudo signal k2 in which a desired level adjustment is applied to the pseudo signal k2, and generates the motor driving voltage based on the pseudo signal k2. At this time, the motor driver U2 supplies the output signal c2 having the voltage value of the motor driving voltage to the port switching circuit 19 of the MCU 110 via its own output end and the output terminal T4.

In the following, the operation of the electronic control apparatus 100 is described.

The MCU 110 of the electronic control apparatus 100 operates in the normal operation mode and the monitoring mode as follows.

[Normal Operation Mode]

In the normal operation mode, the MCU 110 supplies the motor control signal generated by the control signal generation part 30 to the motor driver U2, supplies the sensor control signal to the sensor U3, and supplies the display control signal to the display driver U4.

[Monitoring Mode]

Figure 3:
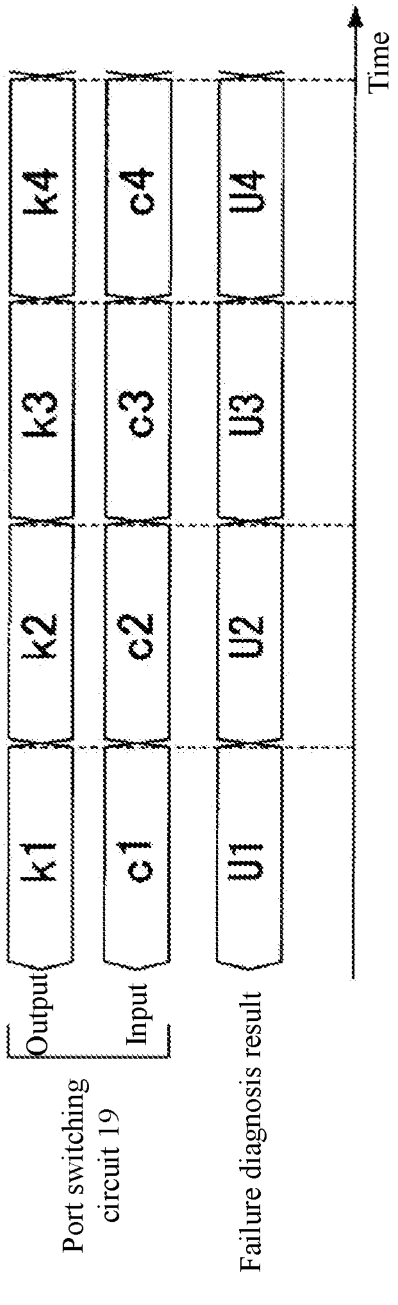
FIG. 3 is a time chart illustrating an example of a monitoring sequence.

In the monitoring mode, the MCU 110 monitors, in order, whether each of the power circuit U1, the motor driver U2, the sensor U3, and the display driver U4 as the peripheral machines has a failure according to the monitoring sequence shown in FIG. 3. In the monitoring sequence shown in FIG. 3, the input/output of the port switching circuit 19 and the output of the failure diagnosis result data to the RAM 12 are switched over time. In the case where such time-divided driving is performed, for example, the control using the timer 15 connected to the sequencer 14 may be performed.

That is, firstly, the port switching circuit 19 of the MCU 110 outputs the pseudo signal k1 for failure checking with respect to the power circuit U1, and supplies the pseudo signal k1 to the power circuit U1. Accordingly, the power circuit U1 generates the output signal c1 in response to the pseudo signal k1. At this time, the port switching circuit 19 inputs the output signal c1 generated by the power circuit U1 and supplies the output signal c1 to the failure diagnosis part 17. Then, the failure diagnosis part 17 determines whether the output signal c1 is consistent with the expected value corresponding to the output signal c1. Here, the failure diagnosis part 17 acquires the failure diagnosis result data indicating that there is no failure in the case where the output signal c1 is consistent with the expected value and indicating that there is a failure in the case where the output signal c1 is not consistent with the expected value and representing the failure diagnosis result of the power circuit U1, and stores the failure diagnosis result data in the RAM 12 via the DMA 18.

Then, the port switching circuit 19 outputs the pseudo signal k2 for failure checking with respect to the motor driver U2, and supplies the pseudo signal k2 to the motor driver U2. Accordingly, the motor driver U2 generates the output signal c2 in response to the pseudo signal k2. At this time, the port switching circuit 19 inputs the output signal c2 generated by the motor driver U2 and supplies the output signal c2 to the failure diagnosis part 17. Then, the failure diagnosis part 17 determines whether the output signal c2 is consistent with the expected value corresponding to the output signal c2. Here, the failure diagnosis part 17 acquires the failure diagnosis result data indicating that there is no failure in the case where the output signal c2 is consistent with the expected value and indicating that there is a failure in the case where the output signal c2 is not consistent with the expected value and representing the failure diagnosis result of the motor driver U2, and stores the failure diagnosis result data in the RAM 12 via the DMA 18.

Then, the port switching circuit 19 outputs the pseudo signal k3 for failure checking with respect to the sensor U3, and supplies the pseudo signal k3 to the sensor U3. Accordingly, the sensor U3 generates the output signal c3 in response to the pseudo signal k3. At this time, the port switching circuit 19 inputs the output signal c3 generated by the sensor U3 and supplies the output signal c3 to the failure diagnosis part 17. Then, the failure diagnosis part 17 determines whether the output signal c3 is consistent with the expected value corresponding to the output signal c3. Here, the failure diagnosis part 17 acquires the failure diagnosis result data indicating that there is no failure in the case where the output signal c3 is consistent with the expected value and indicating that there is a failure in the case where the output signal c3 is not consistent with the expected value and representing the failure diagnosis result of the sensor U3, and stores the failure diagnosis result data in the RAM 12 via the DMA 18.

Then, the port switching circuit 19 outputs the pseudo signal k4 for failure checking with respect to the display driver U4, and supplies the pseudo signal k4 to the display driver U4. Accordingly, the display driver U4 generates the output signal c4 in response to the pseudo signal k4. At this time, the port switching circuit 19 inputs the output signal c4 generated by the display driver U4 and supplies the output signal c4 to the failure diagnosis part 17. Then, the failure diagnosis part 17 determines whether the output signal c4 is consistent with the expected value corresponding to the output signal c4. Here, the failure diagnosis part 17 acquires the failure diagnosis result data indicating that there is no failure in the case where the output signal c4 is consistent with the expected value and indicating that there is a failure in the case where the output signal c4 is not consistent with the expected value and representing the failure diagnosis result of the display driver U4, and stores the failure diagnosis result data in the RAM 12 via the DMA 18.

In this way, in the electronic control apparatus 100, the diagnosis on whether each of the power circuit U1, the motor driver U2, the sensor U3, and the display driver U4, as the peripheral machines of the MCU 110, has a failure is performed in a time-divided manner by using the internal circuits of the MCU 110. That is, as described above, the determination on whether a peripheral machine has a failure is performed by the RAM 12, the sequencer 14, the timer 15, the pseudo signal generation part 16, the failure diagnosis part 17, the DMA 18, and the port switching circuit 19.

Thus, according to the electronic control apparatus 100, it is possible to reduce the scale as compared to the conventional configuration in which the monitor for failure monitoring is provided outside the MCU for each peripheral machine. In addition, with the MCU collectively monitoring whether multiple peripheral machines fail, the scale can be reduced. Thus, it is possible to monitor whether each of the multiple peripheral machines of the MCU 110 has a failure without increasing the cost.

Moreover, according to the electronic control apparatus 100, since the monitor for failure monitoring is not provided for each peripheral machine, the configuration of the peripheral device 120 is simplified. Accordingly, it is possible to easily assemble the peripheral device 120.

Embodiment 2

Figure 4:
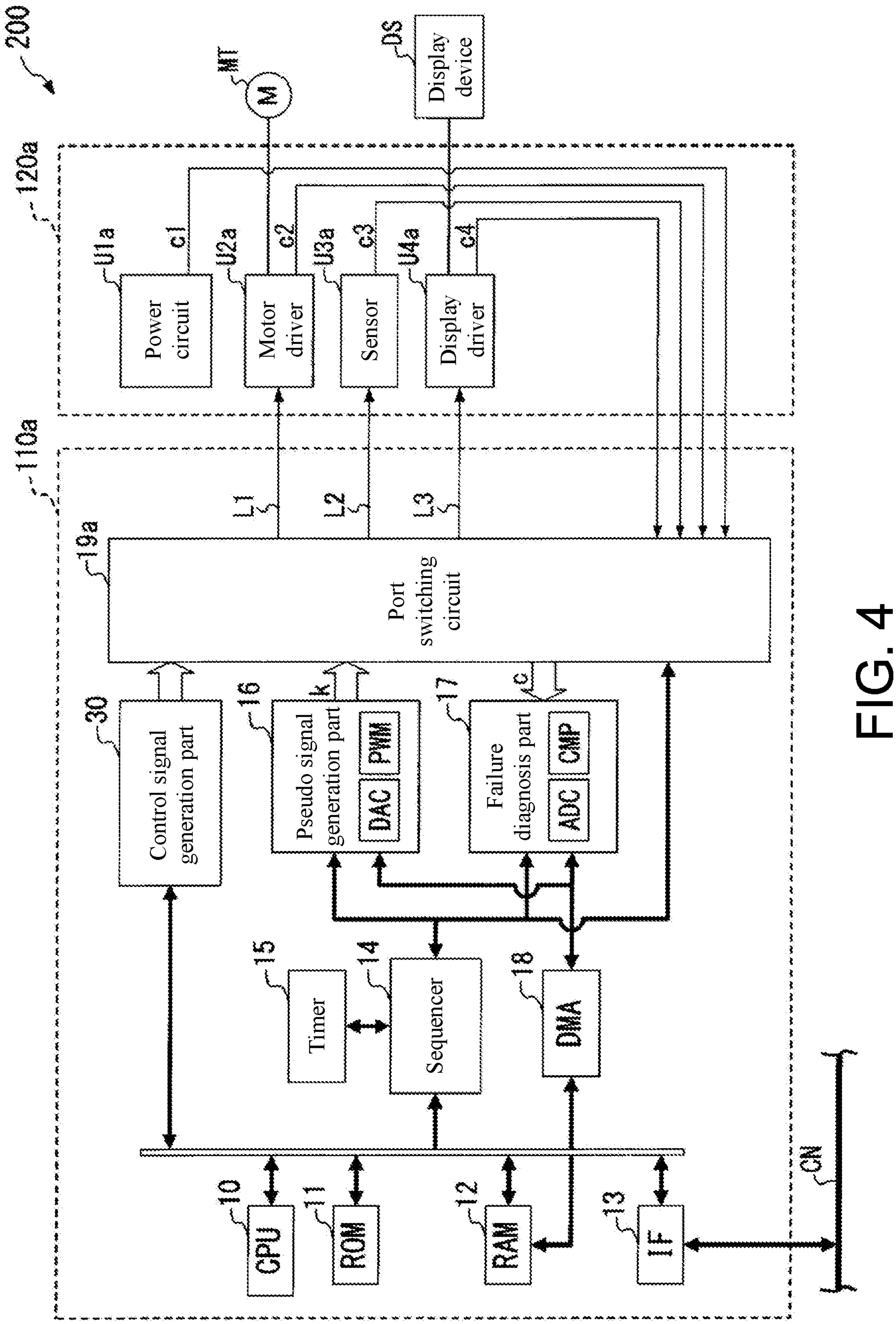
FIG. 4 is a block diagram illustrating a configuration of an electronic control apparatus 200 according to a second embodiment of the disclosure.

FIG. 4 is a block diagram illustrating a configuration of an electronic control apparatus 200 according to a second embodiment of the disclosure.

It is noted that, in the electronic control apparatus 200, a port switching circuit 19*a* is adopted in place of the port switching circuit 19 shown in FIG. 1, and a power circuit U1*a*, a motor driver U2*a*, a sensor U3*a*, and a display driver U4*a* are adopted in place of the power circuit U1, the motor driver U2, the sensor U3, and the display driver U4. Except for the above, the configuration of the electronic control apparatus 200 is the same as the configuration shown in FIG. 1.

Figure 5:
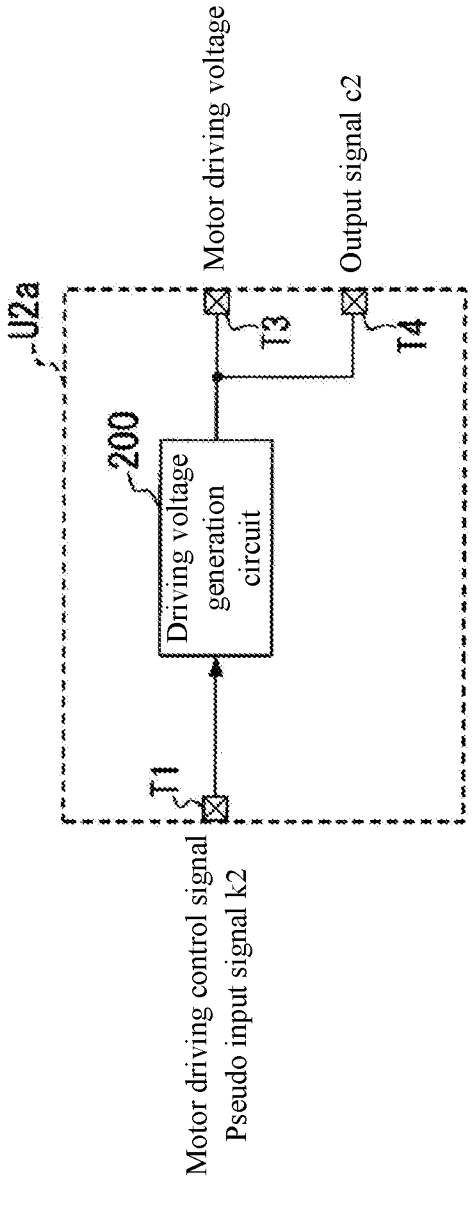
FIG. 5 is a block diagram illustrating an input/output configuration of a motor driver U2*a*.

FIG. 5 is a block diagram extracting the motor driver U2*a* from the power circuit U1*a*, the motor driver U2*a*, the sensor U3*a*, and the display driver U4*a* respectively as the peripheral machines, and illustrating an input/output configuration of each peripheral machine.

In the configuration shown in FIG. 5, the input terminal T2 dedicated for inputting the pseudo signal is omitted from the configuration shown in FIG. 2, and the control signal at the time of the normal mode or the pseudo signal at the time of the monitoring mode are received by using the input terminal T1. That is, at the time of the monitoring mode, the port switching circuit 19*a* supplies the pseudo signals k1 to k4 to the input terminals T1 of the power circuit U1*a*, the motor driver U2*a*, the sensor U3*a*, and the display driver U4*a*, respectively, like the control signals at the time of the normal mode.

At the time of the normal operation mode, the port switching circuit 19*a* supplies the motor control signal to the input terminal T1 of the motor driver U2*a* via an input wiring L1, and at the time of the monitoring mode, the port switching circuit 19*a* supplies the pseudo signal k2 to the input terminal T1 of the motor driver U2*a* via the input wiring L1. In addition, at the time of the normal operation mode, the port switching circuit 19*a* supplies the sensor control signal to the input terminal T1 of the sensor U3*a* via an input wiring L2, and at the time of the monitoring mode, the port switching circuit 19*a* supplies the pseudo signal k3 to the input terminal T1 of the sensor U3*a* via the input wiring L2. Moreover, at the time of the normal operation mode, the port switching circuit 19*a* supplies the display control signal to the input terminal T1 of the display driver U4*a* via an input wiring L3, and at the time of the monitoring mode, the port switching circuit 19*a* supplies the pseudo signal k4 to the input terminal T1 of the display driver U4*a* via the input wiring L3.

It is noted that, in the port switching circuit 19*a*, for the operations other than the above, the operations same as the operations of the port switching circuit 19 are performed.

That is, in the case where it is possible to adopt, as the pseudo signal for failure checking, a signal whose waveform and amplitude are the same as those of the control signal for normal operation, the number of wirings and the number of terminals can be reduced with respect to the configuration shown in FIGS. 1 and 2 by adopting the configuration shown in FIGS. 4 and 5 as the electronic control apparatus.

Embodiment 3

Figure 6:
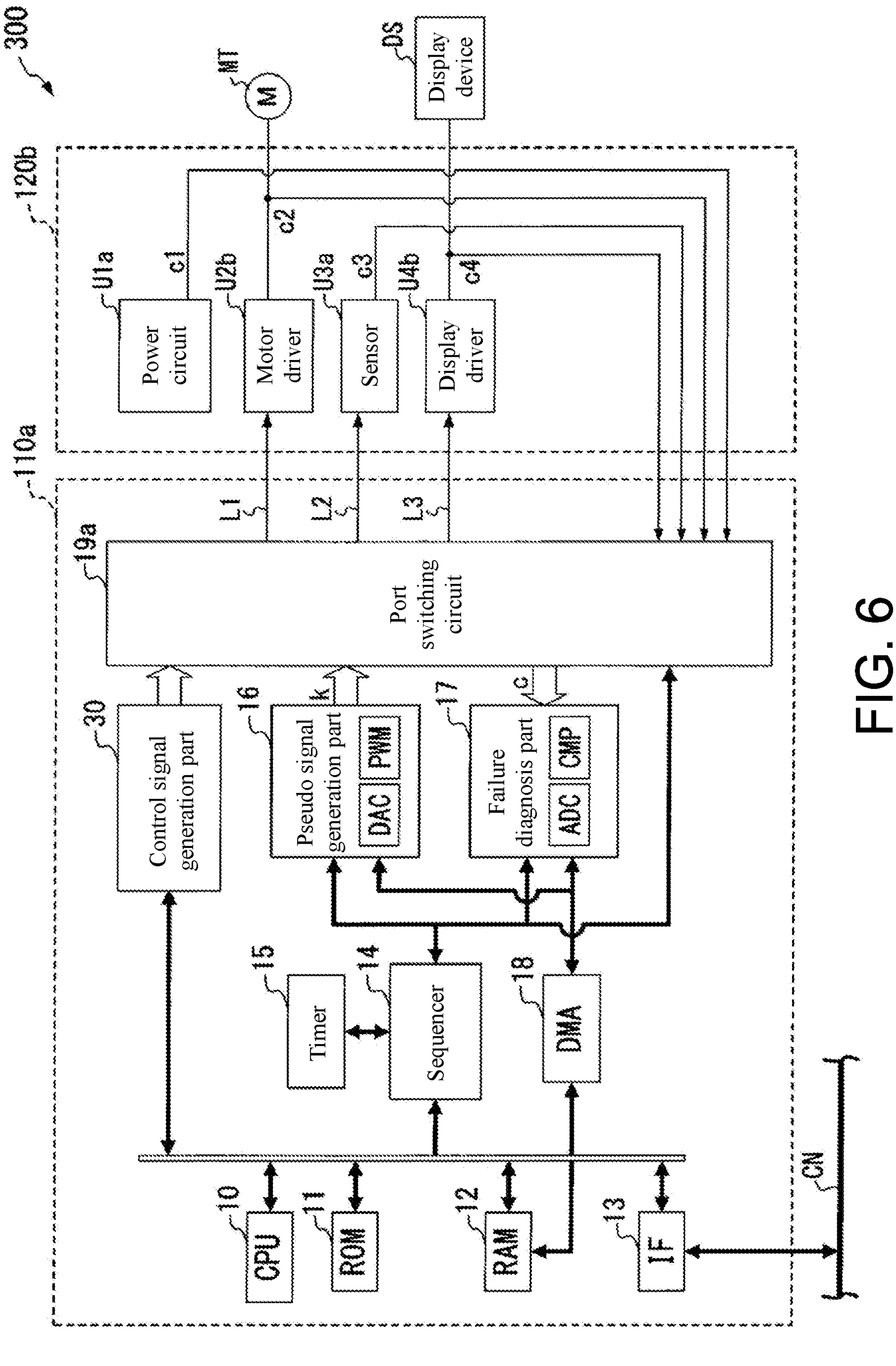
FIG. 6 is a block diagram illustrating a configuration of an electronic control apparatus 300 according to a third embodiment of the disclosure.

FIG. 6 is a block diagram illustrating a configuration of an electronic control apparatus 300 according to a third embodiment of the disclosure.

It is noted that, in the electronic control apparatus 300, in place of the motor driver U2*a* and the display driver U4*a* shown in FIG. 4, a motor driver U2*b* and a display driver U4*b* are adopted. Except for the above, the configuration of the electronic control apparatus 300 is the same as the configuration shown in FIG. 4.

Figure 7:
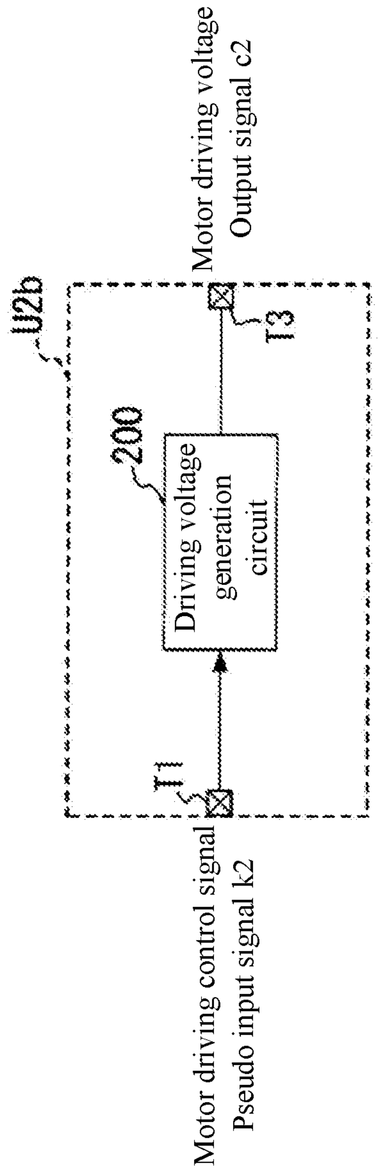
FIG. 7 is a block diagram illustrating an input/output configuration of a motor driver U2*b*.

FIG. 7 is a block diagram extracting the motor driver U2*b* from the motor driver U2*b* and the display driver U4*b* and illustrating an input/output configuration therein.

In the configuration shown in FIG. 7, the output terminal T4 dedicated for outputting the output signal is omitted from the configuration shown in FIG. 5, and, the motor driving voltage generated by the main function part 200 is output as the output signal by using the output terminal T3 at the time of the normal mode, or a signal indicating the voltage value of the motor driving voltage generated by the main function part 200 is output as the output signal by using the output terminal T3 at the time of the monitoring mode. Accordingly, at the time of the monitoring mode, the port switching circuit 19*a* receives a signal indicating the voltage and output from the output terminal T3 of the motor driver U2*b* (the display driver U4*b*) as the output signal c2 (c4).

That is, in the case where the waveform and the amplitude of the voltage output by the main function part 200 in response to the pseudo signal for failure checking at the time of the monitoring mode may be the same as the waveform and the amplitude of the driving voltage for normal operation, by adopting the configuration shown in FIGS. 6 and 7 as the electronic control apparatus, it is possible to simplify the motor driver and the display driver.

Embodiment 4

Figure 8:
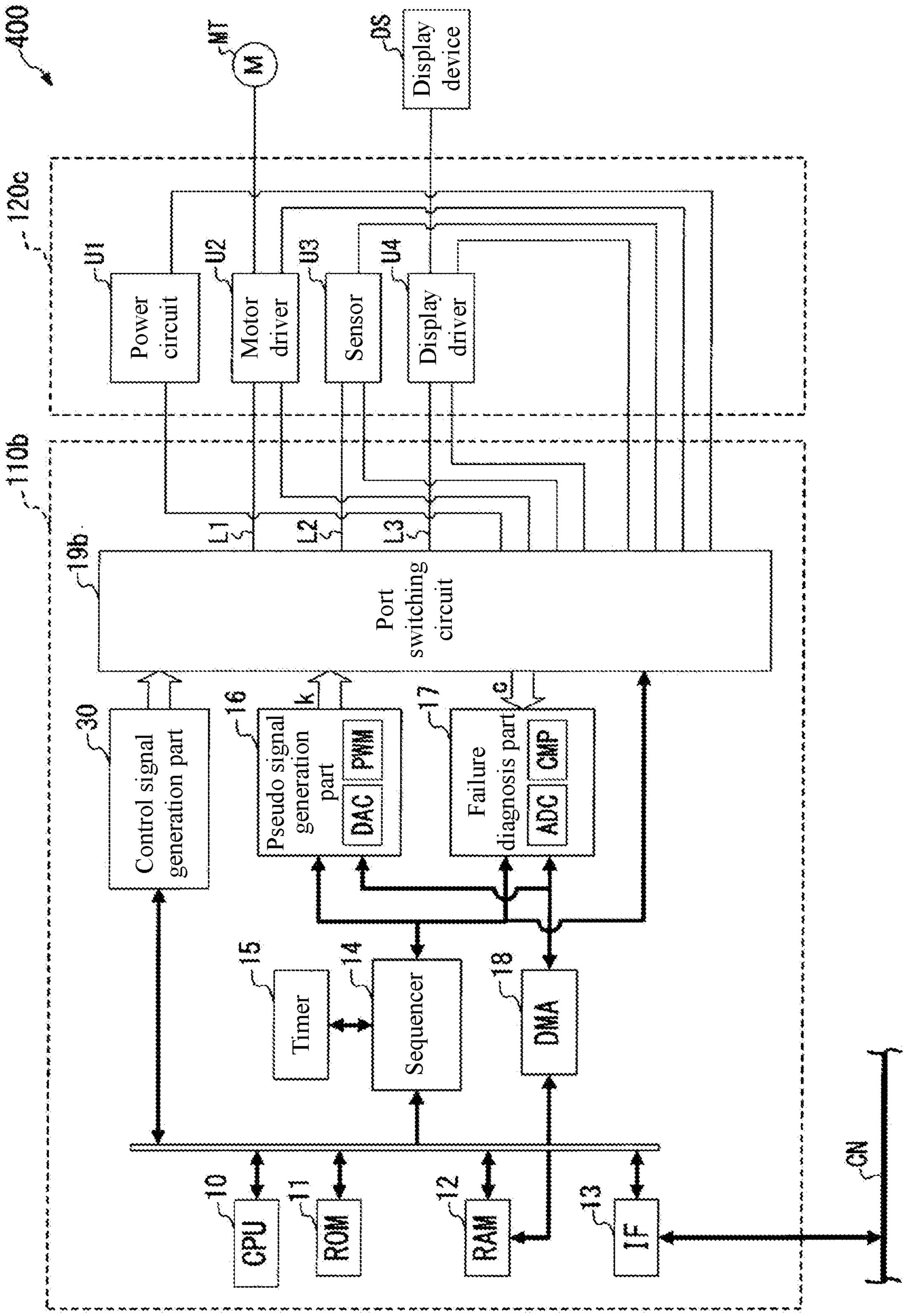
FIG. 8 is a block diagram illustrating a configuration of an electronic control apparatus 400 according to a fourth embodiment of the disclosure.

FIG. 8 is a block diagram illustrating a configuration of an electronic control apparatus 400 according to a fourth embodiment of the disclosure.

In the electronic control apparatus 400, a port switching circuit 19*b* is adopted in place of the port switching circuit 19 shown in FIG. 1, and a motor driver U2*c* and a display driver U4*c* are adopted in place of the motor driver U2 and the display driver U4. Except for the above, the configuration of the electronic control apparatus 400 is the same as the configuration shown in FIG. 1.

Figure 9:
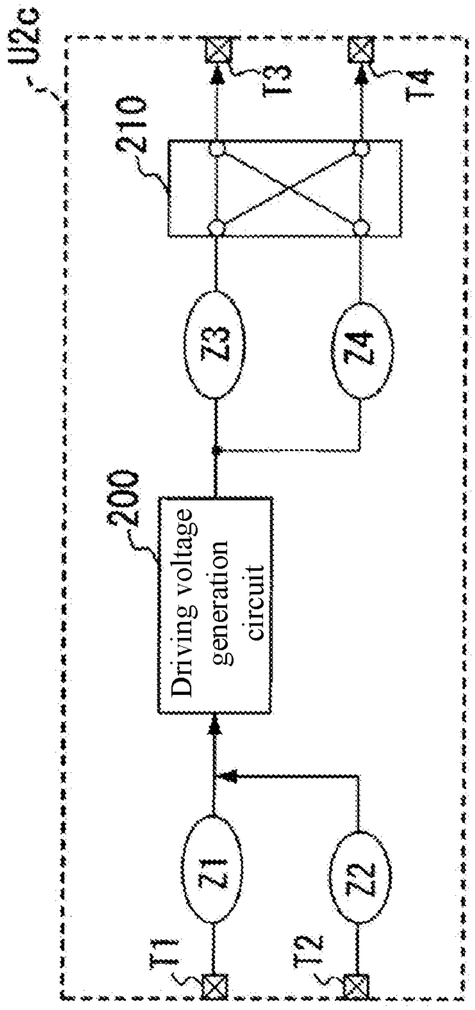
FIG. 9 is a block diagram illustrating an input/output configuration of a motor driver U2*c*.

FIG. 9 is a block diagram extracting the motor driver U2*c* from the motor driver U2*c* and the display driver U4*c* and illustrating an input/output configuration therein.

As shown in FIG. 9, the motor driver U2*c* has the main function part 200, the input terminals T1, T2, the output terminals T3, T4, and an output switching circuit 210. Moreover, in FIG. 9, a network Z1 included in a path between the input terminal T1 and the main function part 200, a network Z2 included between the input terminal T2 and the main function part 200, a network Z3 included between a path between the main function part 200 and the output terminal T3, and a network Z4 included between a path between the main function part 200 and the output terminal T4 are shown. It is noted that the networks Z1 and Z2 are the same as each other, or the two do not differ to an extent that generates a significant difference in the operation of the main function part 200 (e.g., the internal resistances are different or the gains are different from each other).

Here, the operation of the port switching circuit 19*b* in each of the normal mode and the monitoring mode is the same as the port switching circuit 19.

However, the port switching circuit 19*b* is provided with a failure avoidance function, with which even if a failure (a disconnection, a short circuit, etc.) occurs on the path of the network Z1 between the input terminal T1 of the peripheral machine and the input end of the main function part 200 or the path of the network Z2 between the input end T2 and the input end of the main function part 200, it is still possible to continue the normal operation. Moreover, the port switching circuit 19*b* is provided with a failure avoidance function with which even if a failure occurs on the path of the network Z3 or the path of the network Z4 (a disconnection, a short circuit, etc.,) shown in FIG. 9, it is still possible to continue the normal operation.

For example, in the case where a failure occurs on the path including the network Z1 between the input terminal T1 and the main function part 200 shown in FIG. 9, the port switching circuit 19*b* supplies the control signal for normal operation to the input terminal T2 at the time of the normal operation mode, and supplies the pseudo signal for failure checking to the input terminal T2 at the time of the monitoring mode. That is, in the case where a failure occurs on the path including the network Z1 between the input terminal T1 and the main function part 200, the port switching circuit 19*b* supplies the control signal for normal operation and the pseudo signal for failure checking commonly to the input terminal T2.

Also, for example, in the case where a failure occurs on the path including the network Z2 between the input terminal T2 and the main function part 200 shown in FIG. 9, the port switching circuit 19*b* supplies the control signal for normal operation to the input terminal T1 at the time of the normal operation mode, and supplies the pseudo signal for failure checking to the input terminal T1 at the time of the monitoring mode. That is, in the case where a failure occurs on the path including the network Z2 between the input terminal T2 and the main function part 200, the port switching circuit 19*b* supplies the control signal for normal operation and the pseudo signal for failure checking commonly to the input terminal T1.

In addition, for example, among the paths of the respective networks Z3 and Z4 connected to the output end of the main function part 200 shown in FIG. 9, in the case where a failure occurs on the path of the network Z3, the port switching circuit 19*b* controls the output switching circuit 210 so as to connect the output of the network Z4 with the output terminals T3 and T4. In addition, in the case where a failure occurs on the path of the network Z4 shown in FIG. 9, the port switching circuit 19*b* controls the output switching circuit 210 so as to connect the output of the network Z3 with the output terminals T3 and T4. It is noted that, in the case where neither of the paths of the networks Z3 and Z4 has a failure, the port switching circuit 19*b* controls the output switching circuit 210 so that the output of the network Z3 is connected to the output terminal T3, and the output of the network Z4 is connected to the output terminal T4.

Thus, according to the configuration of the electronic control apparatus 400 shown in FIGS. 8 and 9, even if a failure occurs on the input path and the output path in the peripheral machine, for example, it is still possible to continue implementing the operations in the normal operation mode and the monitoring mode respectively.

It is noted that, in the electronic control apparatus 100, 200, 300, or 400, the monitoring mode is set in response to power being turned on, and after a series of processes are executed in accordance with the monitoring sequence shown in FIG. 3, the normal mode may be set fixedly, or it may also be that, after the power is turned on, the state of the normal mode and the state of the monitoring mode are alternately switched by the sequencer 14.

In addition, when the normal mode and the monitoring mode are alternately switched in this way, the switching timing for each peripheral machine (U1 to U4) may be different.

Figure 10:
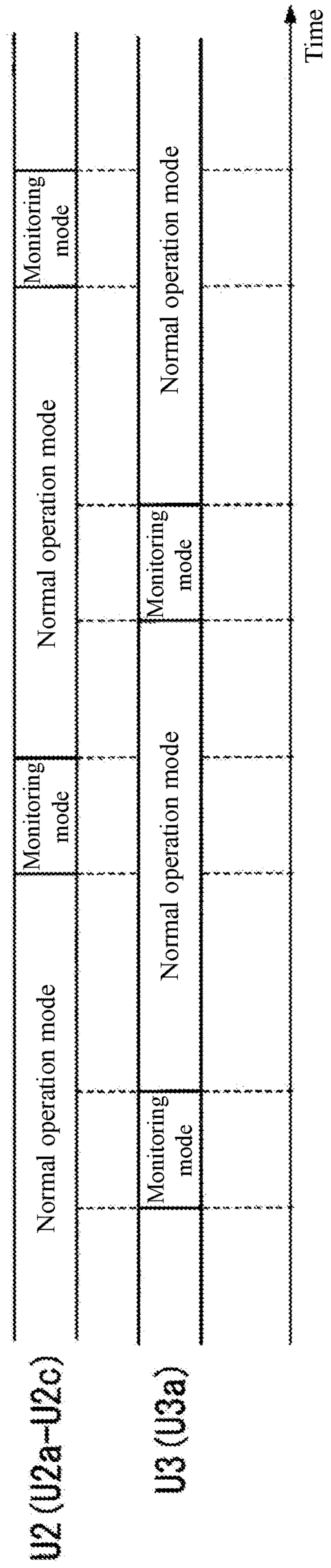
FIG. 10 is a time chart illustrating an example of a timing for switching from a normal operation mode to a monitoring mode or from the monitoring mode to the normal operation mode in each of a motor driver and a sensor.

FIG. 10 is a time chart illustrating an example of mode switching timings of the motor driver U2 (U2*a* to U2*c*) and the sensor U3 (U3*a*), respectively, executed by the sequencer 14 in view of such point.

At this time, as shown in FIG. 10, with the sequencer 14 executing the control where the mode switching timings from the normal operation mode to the monitoring mode or from the monitoring mode to the normal operation mode are different for each of the peripheral machines (e.g., U2, U3) or executing the monitoring sequence shown in FIG. 3, it is possible to secure the resource of the CPU 10.

It is noted that, although the peripheral machines connected to the MCU 110 are set as the power circuit U1, the motor driver U2, the sensor U3, and the display driver U4 in the above embodiment, it suffices as long as the number of the peripheral machines connected to the MCU 110 is equal to or more than n (n being an integer of 2 or more). In addition, a peripheral machine having another configuration may also be used.

In addition, in the above embodiment, the configuration that the peripheral machines (U1 to U4) are controlled by the MCU 110 is described. However, a controller, such as a programmable logic controller (PLC) which performs the same operation like the MCU 110 may also be used in place of the MCU 110.

In brief, as the electronic control apparatus (100, 200, 300, 400), it suffices as long as the electronic control apparatus includes the controller as described below and multiple peripheral machines respectively receiving signals output from the controller and performing outputting in response to the received signals.

The controller (MCU 110) includes the peripheral interface part and the failure diagnosis part as follows.

The peripheral interface part (16, 19, 19*a*, 19*b*, 30) outputs the control signal for normal operation at the time of the normal operation mode and inputs the control signal to the peripheral machines, and outputs the pseudo signal for failure checking at the time of the monitoring mode, inputs the pseudo signal to at least one of the peripheral machines, and captures the output signal output by the at least one peripheral machine in response to the pseudo signal. The failure diagnosis part (17) obtains the failure diagnosis result according to whether the output signal captured by the peripheral interface part is consistent with the predetermined expected value.

What is claimed is:

1. An electronic control apparatus, comprising:

a plurality of peripheral machines, each performing outputting in response to a signal that is input;

a controller, set to a normal operation mode or a monitoring mode, controlling the peripheral machines at a time of the normal operation mode, and performing diagnosis on whether a failure occurs with respect to at least one of the peripheral machines at a time of the monitoring mode; and a sequencer, wherein the sequencer periodically switches the controller between the normal operation mode and the monitoring mode in accordance with timing signals supplied from a timer coupled to the sequencer, wherein at the time of the normal operation mode, the controller outputs a control signal for normal operation and inputs the control signal to the peripheral machines, and at the time of the monitoring mode, the controller outputs a pseudo signal for failure checking, inputs the pseudo signal to the at least one peripheral machine, captures an output signal output by the at least one peripheral machine in response to the pseudo signal, and obtains a failure diagnosis result according to whether the output signal that is captured is consistent with a predetermined expected value.

2. The electronic control apparatus as claimed in claim 1, wherein the controller comprises:

a peripheral interface part, outputting the control signal for normal operation and inputting the control signal to the peripheral machines at the time of the normal operation mode, and, at the time of the monitoring mode, outputting the pseudo signal for failure checking, inputting the pseudo signal to the at least one peripheral machine, and capturing the output signal output by the at least one peripheral machine in response to the pseudo signal; and a failure diagnosis part, obtaining the failure diagnosis result according to whether the output signal captured by the peripheral interface part is consistent with the predetermined expected value.

3. The electronic control apparatus as claimed in claim 2, wherein the peripheral interface part outputs, one after another in order, a plurality of pseudo signals for failure checking in correspondence with each of the peripheral machines and inputs the pseudo signals to the corresponding peripheral machines, and captures output signals output in order from the peripheral machines and supplies the output signals to the failure diagnosis part.

4. The electronic control apparatus as claimed in claim 3, wherein the controller comprises:

a ROM storing a program;

a CPU controlling the peripheral machines in accordance with the program stored in the ROM, wherein the sequencer is configured to control operations of the peripheral interface part and the failure diagnosis part.

5. The electronic control apparatus as claimed claim 3, wherein the at least one peripheral machine comprises:

a first input terminal, into which the control signal output from the peripheral interface part is input;

a second input terminal, into which the pseudo signal output from the peripheral interface part is input;

a first output terminal for outputting the output signal to a load; and a second output terminal for outputting the output signal to the peripheral interface part.

6. The electronic control apparatus as claimed in claim 3, comprising a plurality of input wirings respectively and individually connecting the peripheral interface part and the peripheral machines, wherein the peripheral interface part is configured to:

when being set to the normal operation mode, respectively input a plurality of control signals to the peripheral machines via the input wirings, and when being set to the monitoring mode, input the pseudo signal to the at least one peripheral machine via the input wiring.

7. The electronic control apparatus as claimed in claim 3, wherein the at least one peripheral machine comprises:

a main function part, responsible for a main operation;

a first input terminal, connected to an input terminal of the main function part via a first network;

a second input terminal, connected to the input terminal of the main function part via a second network;

a first output terminal, connected to an output terminal of the main function part via a third network; and a second output terminal, connected to the output terminal of the main function part via a fourth network, wherein the peripheral interface part has a configuration able to selectively input each of the control signal and the pseudo signal to the first input terminal or the second input terminal, and has a configuration able to selectively output each of an output of the third network and an output of the fourth network to the first output terminal or the second output terminal.

8. The electronic control apparatus as claimed in claim 2, wherein the controller comprises:

a ROM storing a program; and a CPU controlling the peripheral machines in accordance with the program stored in the ROM, wherein the sequencer is configured to control operations of the peripheral interface part and the failure diagnosis part.

9. The electronic control apparatus as claimed in claim 8, wherein the sequencer alternately switches the peripheral interface part and the failure diagnosis part from the normal operation mode to the monitoring mode or from the monitoring mode to the normal operation mode, and with respect to at least two of the peripheral machines, timings for switching from the normal operation mode to the monitoring mode or from the monitoring mode to the normal operation mode are different.

10. The electronic control apparatus as claimed claim 8, wherein the at least one peripheral machine comprises:

a first input terminal, into which the control signal output from the peripheral interface part is input;

a second input terminal, into which the pseudo signal output from the peripheral interface part is input;

a first output terminal for outputting the output signal to a load; and a second output terminal for outputting the output signal to the peripheral interface part.

11. The electronic control apparatus as claimed in claim 8, comprising a plurality of input wirings respectively and individually connecting the peripheral interface part and the peripheral machines, wherein the peripheral interface part is configured to:

when being set to the normal operation mode, respectively input a plurality of control signals to the peripheral machines via the input wirings, and when being set to the monitoring mode, input the pseudo signal to the at least one peripheral machine via the input wiring.

12. The electronic control apparatus as claimed in claim 2, wherein the at least one peripheral machine comprises:

a first input terminal, into which the control signal output from the peripheral interface part is input;

a second input terminal, into which the pseudo signal output from the peripheral interface part is input;

a first output terminal for outputting the output signal to a load; and a second output terminal for outputting the output signal to the peripheral interface part.

13. The electronic control apparatus as claimed in claim 2, comprising a plurality of input wirings respectively and individually connecting the peripheral interface part and the peripheral machines, wherein the peripheral interface part is configured to:

when being set to the normal operation mode, respectively input a plurality of control signals to the peripheral machines via the input wirings, and when being set to the monitoring mode, input the pseudo signal to the at least one peripheral machine via the input wiring.

14. The electronic control apparatus as claimed in claim 2, wherein the at least one peripheral machine comprises:

a main function part, responsible for a main operation;

a first input terminal, connected to an input terminal of the main function part via a first network;

a second input terminal, connected to the input terminal of the main function part via a second network;

a first output terminal, connected to an output terminal of the main function part via a third network; and a second output terminal, connected to the output terminal of the main function part via a fourth network, wherein the peripheral interface part has a configuration able to selectively input each of the control signal and the pseudo signal to the first input terminal or the second input terminal, and has a configuration able to selectively output each of an output of the third network and an output of the fourth network to the first output terminal or the second output terminal.

15. An electronic control apparatus, comprising:

a plurality of peripheral functions, each performing outputting in response to a signal that is input;

a control function, set to a normal operation mode or a monitoring mode, controlling the peripheral machines at a time of the normal operation mode, and performing diagnosis on whether a failure occurs with respect to at least one of the peripheral machines at a time of the monitoring mode, wherein in the control function, a control signal for normal operation is output and the control signal is input to the peripheral machines at the time of the normal operation mode, and, at the time of the monitoring mode, a pseudo signal for failure checking is output, the pseudo signal is input to the at least one peripheral machine, and an output signal output by the at least one peripheral machine in response to the pseudo signal is captured, and a failure diagnosis result is obtained according to whether the output signal that is captured is consistent with a predetermined expected value; and a sequence function, periodically switching the control function between the normal operation mode and the monitoring mode in accordance with timing signals supplied from a timer.

16. An electronic control apparatus, controlling a plurality of peripheral machines, the electronic control apparatus performing:

a first control in response to being set to a normal operation mode, respectively supplying a plurality of control signals controlling the peripheral machines to the peripheral machines;

a second control in response to being set to a monitoring mode, supplying a pseudo signal for failure checking to at least one of the peripheral machines, capturing an output signal output by the at least one peripheral machine in accordance with the pseudo signal, and obtaining a failure diagnosis result according to whether the output signal that is captured is consistent with a predetermined expected value; and a sequence control, periodically switching between the normal operation mode and the monitoring mode in accordance with timing signals supplied from a timer.

* * * * *